(12) United States Patent
Mintz et al.

(10) Patent No.: US 11,989,779 B2
(45) Date of Patent: May 21, 2024

(54) CONFIGURABLE ORDER ENTRY, MATCHING, COORDINATION, AND MARKET DATA INTERVALS

(71) Applicant: Trading Technologies International, Inc., Chicago, IL (US)

(72) Inventors: Sagy Pundak Mintz, Lincolnshire, IL (US); Brian J. Buck, Lisle, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 13/645,185

(22) Filed: Oct. 4, 2012

(65) Prior Publication Data

US 2014/0101017 A1    Apr. 10, 2014

(51) Int. Cl.
*G06Q 40/04* (2012.01)

(52) U.S. Cl.
CPC .................. *G06Q 40/04* (2013.01)

(58) Field of Classification Search
CPC ........ G06Q 40/04; G06Q 40/00; G06Q 20/00; G06F 7/16
USPC ...................... 705/36–37; 713/150
See application file for complete search history.

(56) References Cited

U.S. PATENT DOCUMENTS

| 6,058,379 | A | * | 5/2000 | Odom et al. .............. 705/37 |
| 7,752,310 | B2 | | 7/2010 | Kageyama |
| 8,041,622 | B1 | | 10/2011 | Schluetter et al. |
| 8,055,575 | B2 | | 11/2011 | Grody et al. |
| 8,204,823 | B1 | | 6/2012 | Morano et al. |
| 8,244,622 | B2 | | 8/2012 | Hughes et al. |
| 8,249,978 | B1 | | 8/2012 | Triplett |

(Continued)

FOREIGN PATENT DOCUMENTS

| JP | 2003-519876 A | 6/2003 |
| WO | 2001/052166 A1 | 7/2001 |
| WO | 2011/117166 A1 | 9/2011 |

OTHER PUBLICATIONS

Sellberg, Lars-Ivar. "Using Adaptive Micro Auctions to provide efficient price discovery when access in terms of latency is differentiated among market participants." White paper [online at http://www.cinnober.com/sites/cinnober.com/files/news/Adaptive-Micro-Auctions_0.pdf], Cinnober Financial Technology AB., Oct. 20, 2010.

(Continued)

*Primary Examiner* — Cho Kwong
(74) *Attorney, Agent, or Firm* — McDonnell Boehnen Hulbert & Berghoff LLP

(57) ABSTRACT

Methods, system and articles of manufacture are disclosed including configurable order entry, matching, coordination and market data intervals. An example method to decouple order entry and matching of contra-side orders includes receiving a trade order during an order entry interval, wherein the order entry interval defines a first period. The example method also includes starting a matching interval at the expiration of the order entry interval, wherein the matching interval includes a second period and wherein the first period is contiguous to the second period. The example method further includes matching the trade order, during the matching interval, with one or more opposing tradable object trade orders received during the order entry interval, the trade order having a same price or same quantity as the one or more opposing trade orders.

16 Claims, 8 Drawing Sheets

(56) References Cited

U.S. PATENT DOCUMENTS

| | | | |
|---|---|---|---|
| 2001/0044767 A1* | 11/2001 | Madoff et al. | 705/37 |
| 2003/0055776 A1 | 3/2003 | Samuelson | |
| 2004/0243502 A1* | 12/2004 | Slowik | G06Q 40/00 705/37 |
| 2005/0102219 A1* | 5/2005 | Taylor | G06Q 40/04 705/37 |
| 2006/0085320 A1* | 4/2006 | Owens | G06Q 40/00 705/37 |
| 2006/0173774 A1* | 8/2006 | Frankel | 705/37 |
| 2007/0219898 A1* | 9/2007 | Burkhardt et al. | 705/37 |
| 2010/0070753 A1* | 3/2010 | Kido et al. | 713/150 |
| 2012/0022991 A1 | 1/2012 | Faier | |
| 2013/0013487 A1* | 1/2013 | Sellberg et al. | 705/37 |

OTHER PUBLICATIONS

PDQ (Procedure Derived Quotes). "The Auction Market: Where Algorithms Compete For Your Order." Accessed May 24, 2013. http://www.pdqats.com/index.html.

Gorham, M., and Singh, N. "Floors to Screens: Nuts and Bolts" Ch. 4 in Electronic Exchanges: The Global Transformation from Pits to Bits, Elsevier Inc., 2009, p. 79-91.

International Search Report and Written Opinion for International Application No. PCT/US2013/035639 dated Jun. 11, 2013 (dated Jun. 21, 2013).

* cited by examiner

CONFIGURABLE ORDER ENTRY, MATCHING, COORDINATION, AND MARKET DATA INTERVALS

FIELD OF THE DISCLOSURE

This disclosure relates generally to electronic trading environments and, more particularly, to matching contra-side orders.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

Conventional electronic exchanges continuously receive orders from traders or devices acting on their behalf, and as each order is received immediately attempts to match the incoming order with the resting orders maintained in the order book of the exchange. This tends to create a situation in which traders race to be the first sent in orders upon having made a trading decision based on receipt of market data. This technology race continues to accelerate as traders seek to shorten the trader's cycle of receiving information, making trading decisions, and sending/changing/deleting orders to a few milliseconds, microseconds, or even nanoseconds. With each decrease in effective cycle time on the part of the trader, the exchange has to expand the processing capability of its trading infrastructure (networks, servers, etc.) to accommodate the increased volumes of data.

DETAILED DESCRIPTION

I. Brief Description of Certain Embodiments

Figure 1:
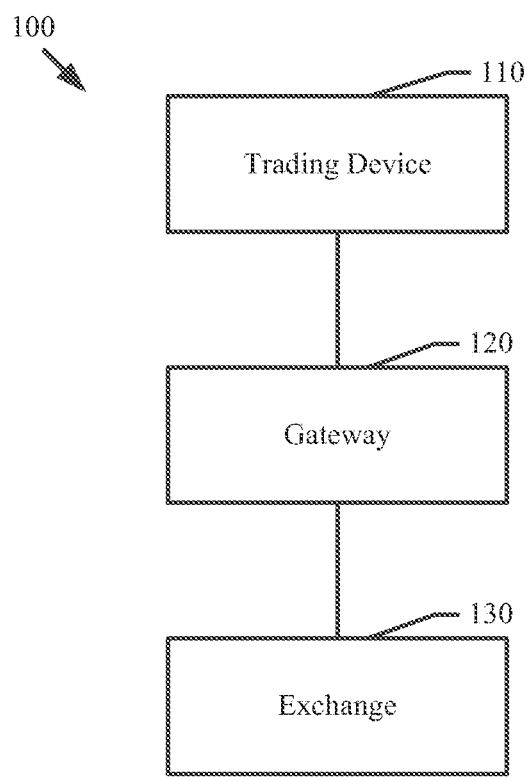
FIG. 1 illustrates a block diagram representative of an exemplary electronic trading system in which certain embodiments may be employed.

The present embodiments relate to accepting bids and offers during a limited interval and matching those bids and offers with contra-side orders received during that limited interval. As used herein, contra-side orders include opposing trade orders having a same price and a same quantity. For example, a sell order is contra-side to a buy order with the same price and same quantity. In some examples, the price or quantity may not be the same. For example, a sell order and a buy order may have the same price, but different quantities, resulting in one or more partial fills. In some examples, the bid price may be higher than the ask price (or may be lower than the ask price) for the same quantity. The order entry intervals are decoupled from the corresponding matching intervals and, thereby, distinguishing at least two different intervals. In some embodiments, the order entry interval may be divided into sub-intervals. Trade orders received during different sub-intervals of the same order entry interval may have different identifiers (e.g., embedded with different timestamps). In some embodiments, a coordination interval is also included. During the coordination interval, the matching engine of the exchange can communicate and coordinate with the matching engine of a plurality of other matching engines. In some examples, the order entry interval, the matching interval and/or the coordination interval may be based on time periods. In some examples, the intervals may be based on the number of trades (or volume) entered or processed during the interval.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

Examples described herein enable decoupling matching contra-side orders by having at least two distinct intervals. A trade order is received by an electronic exchange during an order entry interval. During a subsequent interval, the electronic exchange coordinates with other electronic exchanges regarding a status of the trade order. The electronic exchange matches the trade order received during the order entry interval with a contra-side order also received during the same order entry interval. Alternatively and/or additionally, the electronic exchange may match the trade order with a contra-side trade order received during a previous order entry interval. By matching trade orders received during the same or earlier order entry interval, the incentive of being the first order entry is reduced. Rather, traders benefit by improving the inside market.

An example method to decouple order entry and matching of contra-side orders includes receiving a trade order during an order entry interval, wherein the order entry interval defines a first period. The example method also includes starting a matching interval at the expiration of the order entry interval, wherein the matching interval includes a second time period and wherein the first period is contiguous to the second period, and, matching the trade order, during the matching interval, with one or more opposing trade orders received during the order entry interval, the trade order having a same price or same quantity as the one or more opposing trade orders.

An example system to match contra-side orders includes a processor coupled to a memory and programmed to receive a plurality of trade orders during an order entry interval, wherein the order entry interval defines a first period and to publish a price feed at the expiration of a price feed interval. The example system also programmed to select a trade order from the plurality of trade orders received during the order entry interval and to start a matching interval at the expiration of the order entry interval, wherein the matching interval includes a second period and wherein the first period is contiguous to the second period. The example system also programmed to match the trade order, during the matching interval, with one or more opposing trade orders having a same price or same quantity received during the order entry interval or an earlier order entry interval.

An example tangible computer readable storage medium includes instructions to cause a machine to implement a method to match a contra-side order. The example tangible computer readable storage medium also includes instructions to receive a plurality of trade orders during an order entry interval, wherein the order entry interval defines a first period, and to start a matching interval at the expiration of the order entry interval, wherein the matching interval includes a second period and wherein the first period is contiguous to the second period. The example tangible computer readable storage medium also includes instructions to select a trade order from the plurality of trade orders received during the order entry interval and to coordinate with an electronic exchange regarding a status of the trade order during a coordination interval. The example tangible computer readable storage medium also includes instructions to communicate with at least a coordination hub and the coordination hub communicating with the electronic exchange and match the trade order, during the matching interval, with one or more opposing trade orders having a same price or same quantity received during the coordination interval.

II. Example Electronic Trading System

FIG. 1 illustrates a block diagram representative of an exemplary electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or any combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. (hereinafter referred to as "Trading Technologies". As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
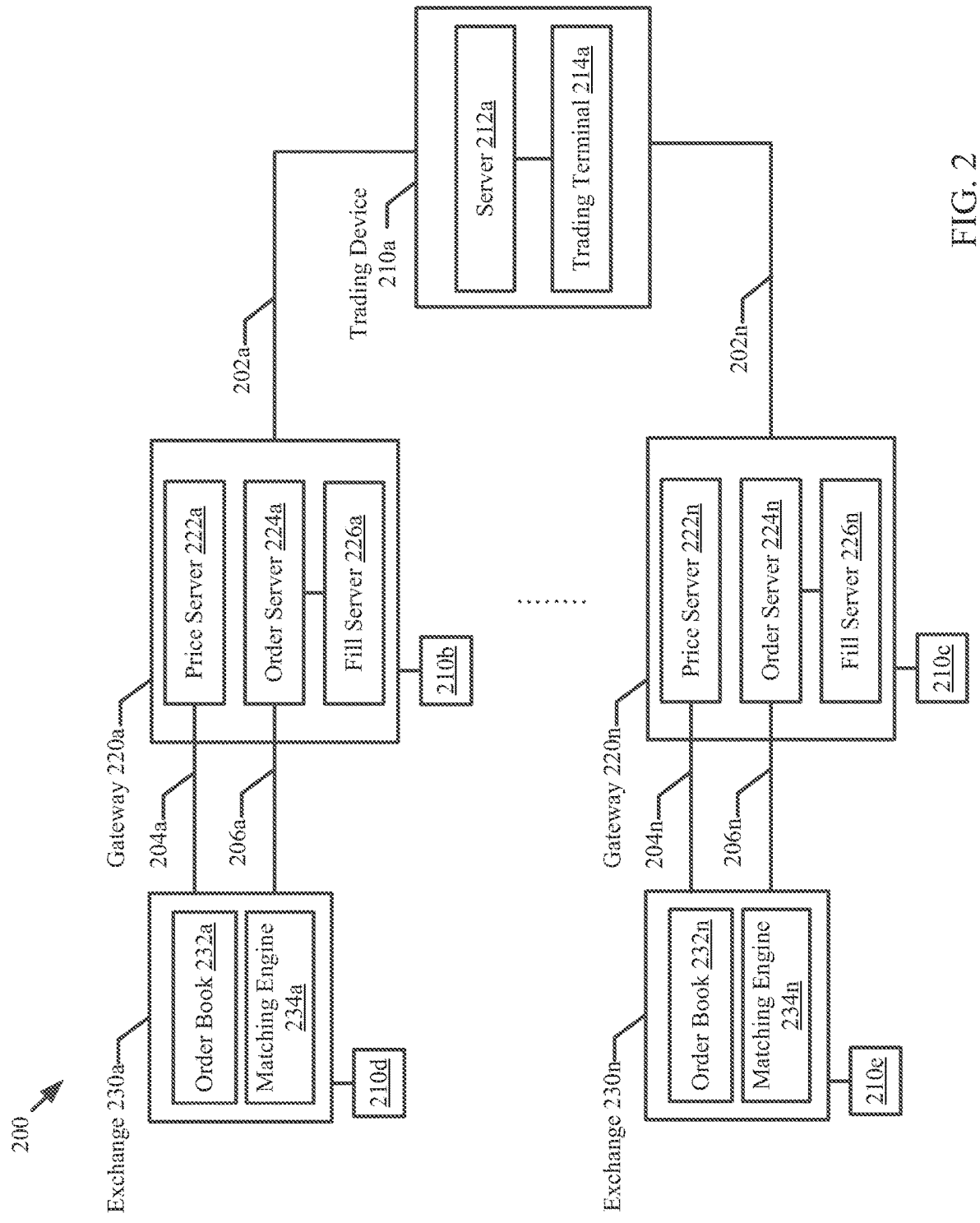
FIG. 2 illustrates a block diagram of another exemplary electronic trading system in which certain embodiments may be employed.

FIG. 2 illustrates a block diagram of another exemplary electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
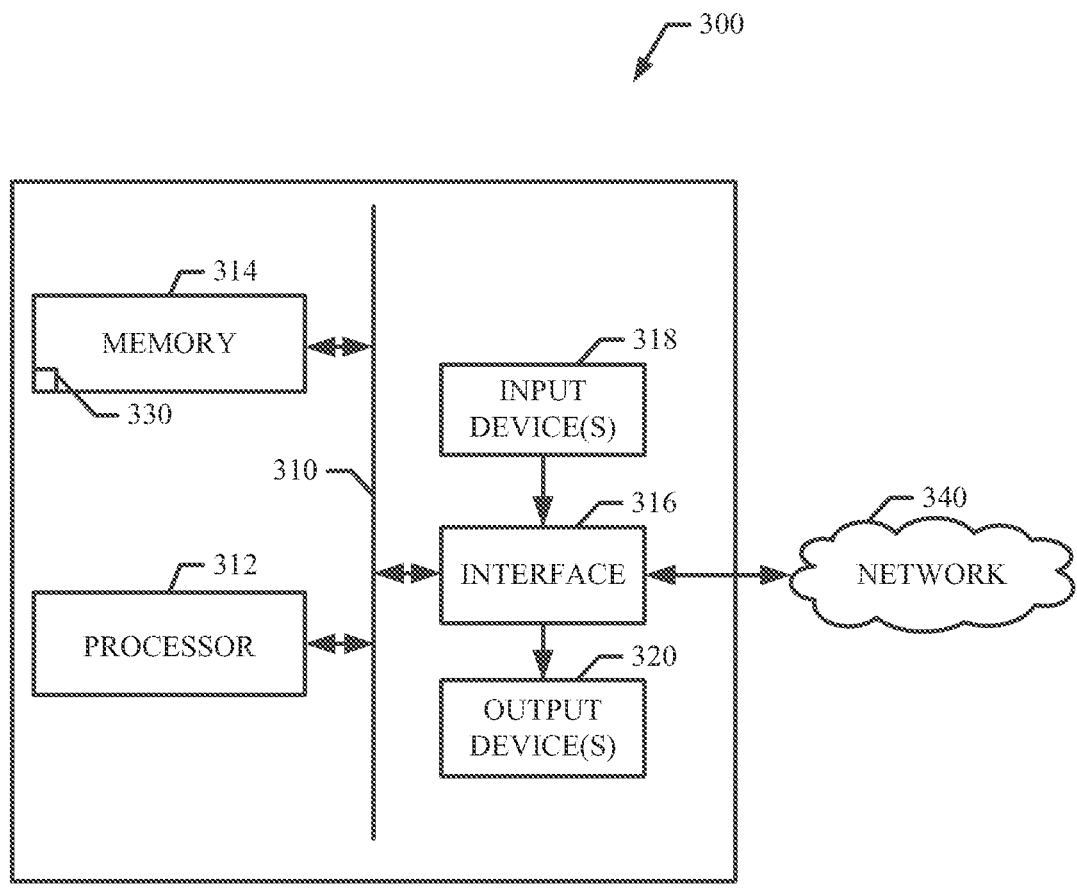
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example. The computing device 300 may include additional, different, or fewer components.

The computing device 300 includes a communication network 310, a processor 312, a memory 314, an interface 316, an input device 318, and an output device 320. The computing device 200 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Example Order Entry Interval and Matching Interval

Figure 4:
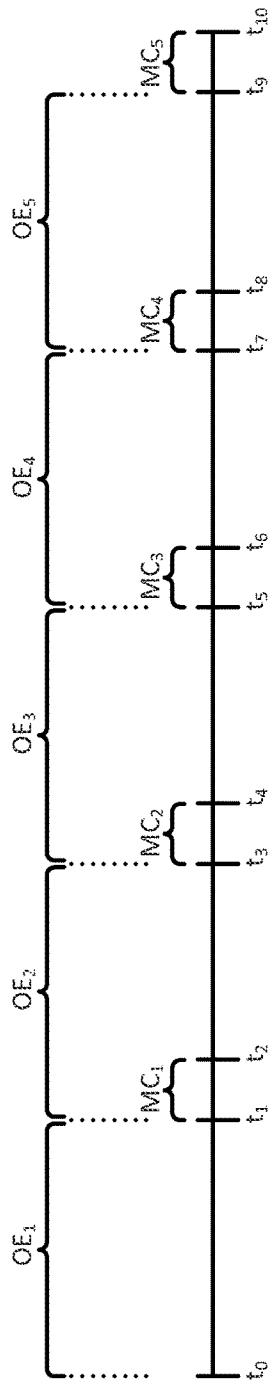
FIG. 4 illustrates an example timing diagram during which an electronic exchange receives trade orders and matches trade orders.

FIG. 4 illustrates an example timing diagram 400 during which an electronic exchange receives trade orders and matches trade orders. In the illustrated example, the electronic exchange, such as the example electronic exchange 130 of FIG. 1, recognizes an order entry interval and a corresponding matching/coordination interval based on time periods. In some examples, the order entry interval and/or the matching/coordination interval may be volume based. For example, a volume based order entry interval may not expire until a predefined number of orders are received. As described below in connection to FIGS. 5 and 6, price feed information may be published at intervals corresponding with the open entry intervals and matching/coordination intervals. For example, order books may update at the end of an order entry interval (which reduces bandwidth requirements and opportunities to "game" the system), may update at the end of the matching interval, may update based on some other time interval, or may continuously update as orders are confirmed by the electronic exchange 130. Trade orders received during the same order entry interval are processed together. In other words, instead of processing each trade order as it is received, the example electronic exchange 130 collects trade orders received during an order entry interval and processes the collected trade orders when the order entry interval expires.

In the illustrated example, a first order entry time interval $OE_1$ in the example timing diagram 400 begins at time $t_0$ and continues until time $t_1$. An order entry interval is an interval of during which trade orders are entered or received at the electronic exchange and uses time periods to determine the duration of the interval. For example, an open entry time interval may a one second time period.

Order entry time intervals may be the same length of time or may vary in length. For example, the time intervals may be defined by regulatory requirements, may vary in length based on the time of day, may vary based on the proximity of the electronic exchange to a market opening event and/or a market closing event, may vary based on the market volatility (e.g., may vary based on the ebb and flow of market conditions) and/or other criteria. Additionally or alternatively, the electronic exchange may randomize the length of the time interval. By doing so, the electronic exchange decreases the probability of a trader "gaming" the system (e.g., entering orders and then deleting/reducing the trade order at the "last moment" of the order entry time interval).

In the illustrated example of FIG. 4, the order entry time intervals are contiguous. For example, the second order entry time interval $OE_2$ begins immediately following the end of the first order entry time interval $OE_1$ at time $t_1$. Alternatively, order entry time intervals may be non-contiguous. For example, during a time period between two order entry time intervals (i.e., order entry time interval $OE_1$ and order entry time interval $OE_2$), trade orders may not be accepted by the electronic exchange.

Matching/coordination intervals are intervals during which the electronic exchange is processing the trade orders received during the corresponding order entry interval. Matching/coordination intervals begin at some time after the close of their corresponding order entry interval. For example, the matching/coordination time interval $MC_1$ (e.g., the time period between time $t_1$ and time $t_2$) corresponds to the order entry time interval $OE_1$ and begins when the example order entry time interval $OE_1$ expires at time $t_1$. Thus, trade orders received during the example order entry time interval $OE_1$ are processed by the electronic exchange during the corresponding example matching/coordination time interval $MC_1$.

Additionally, it is possible to perform a coordination operation during the matching/coordination interval. A coordination operation is one in which the matching engine of an electronic exchange (e.g., the example matching engine 234a of FIG. 2) communicates and coordinates with the matching engine of a plurality of other matching engines, directly or indirectly, to accomplish the matching of a coordinated order. As described in greater detail below in connection to FIG. 7, the example matching interval may be a different length and/or be independent from the example coordination interval.

In the illustrated example of FIG. 4, an order entry interval overlaps with the matching interval corresponding to the previously expired order entry interval. For example, the second order entry time interval $OE_2$ (i.e., the time period time $t_1$ to time $t_3$) overlaps with the first matching time interval $MC_1$. Alternatively, a following order entry time interval may begin when the matching time interval of the previous order entry time interval expires. For example in such an embodiment, the order entry time interval $OE_2$ may not begin until the matching time interval $MC_1$ expires at time $t_2$.

Matching intervals represent the period during which the electronic exchange is matching orders received from traders (or programs or systems operating on their behalf). However, it is possible the example electronic exchange processes and/or responds to other aspects of trade orders outside the matching interval. For example, trade orders may be entered, changed or deleted (in accordance with electronic exchange rules) during any portion of an order entry interval that is not overlapping with a matching interval. In some such examples, the electronic exchange may send acknowledgement of the receipt of and/or successful operation of receiving or modifying or deleting such trade orders during the order entry interval.

Trade orders may be changed, deleted or restricted from being changed or deleted using various techniques. In some examples, trade orders may be changed or deleted at any time during an order entry interval, except during a matching interval. In some such examples, a trade order may be received but not processed/acknowledged because the trade order may be filled and, thus, may not be available at the end of the matching interval. Alternatively, changing/deleting trade orders received during the matching interval may be held until the matching interval expires.

In some examples, once a trade order is received by the electronic exchange, the electronic exchange may not allow changing or deleting the trade order during the same interval. For example, a trade order received during order entry time interval $OE_1$ may not be changed or deleted until at least order entry time interval $OE_2$ begins. Placing these restrictions on modifying trade orders may prevent attempts by traders to "game" the system. For example, a trader is unable to place a large trade order (thereby impacting the inside market of the tradeable object) and then deleting/cancelling the trade order. As a result, traders may be deterred from placing orders they have no intention of being filled.

In some examples, a trade order may not be deleted during the same order entry interval. However, a trade order modification during the same order entry interval that improves the inside market may be permitted. For example, trade order modifications that involve increasing quantities or bettering a price level may be allowed during the same order entry interval. Trade order modifications that negatively impact the inside market (e.g., reduce the quantity, worsen the price, etc.) may not be received/acknowledged. In some examples, these trade order modifications, though, may be accepted during a following order entry interval.

In some examples, a combination of any of these examples may be possible. In some examples, the various trade order modification restrictions may persist longer than the same order entry interval. For example, a trade order modification that negatively impacts the inside market may not be accepted for a number of order entry intervals. For example, a trader may be prevented from deleting a trade order for three (3) order entry intervals.

In some examples, an electronic exchange distributes price feed or market data at different times and/or via different mechanisms. As used herein, price feed includes a plurality of market data such as last traded price, last traded quantity, market information regarding the market depth (e.g., presence and/or quantity of trade orders at best bid or best offer prices and/or prices other than the best bid or best offer) and/or other market information regarding tradeable objects, trade orders, or electronic exchange operations (e.g., limits, rules, fees, hours, etc.) or related market information such as theoretical indicators, news items or other indicators.

VI. Example Order Entry, Matching and Price Feed Intervals

Figure 5:
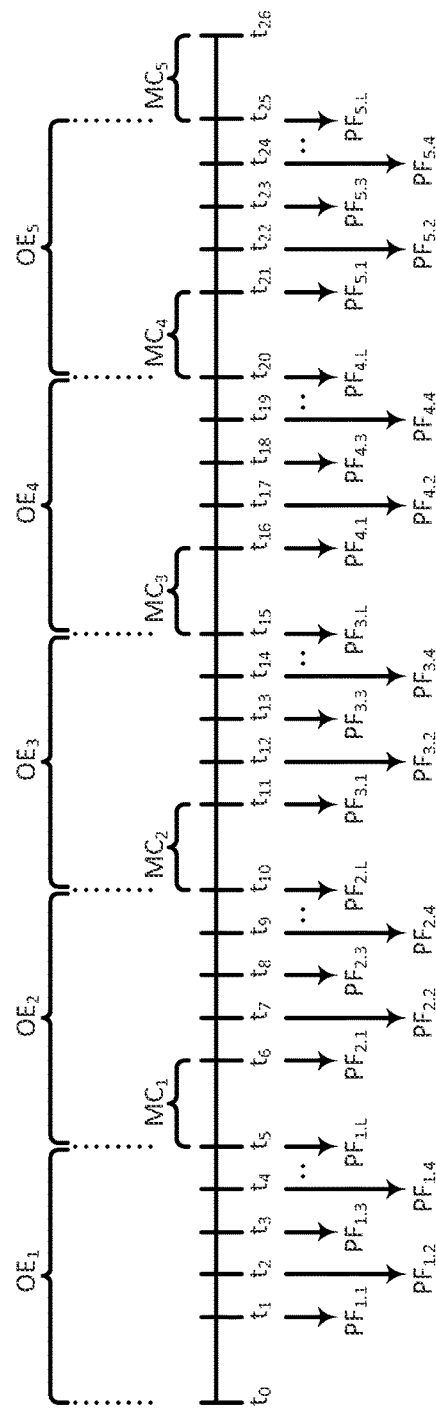
FIG. 5 illustrates an example timing diagram including order entry time intervals and matching time intervals as described in connection to FIG. 4, and also including price feed time intervals.

FIG. 5 illustrates an example timing diagram 500 including order entry intervals and matching intervals as described in connection to FIG. 4, and also including price feed intervals. The timing diagram 500 illustrates a single class or type of price feed information. However, it is to be understood that there may be different classes of price feed information which may be associated with different classes of price feed intervals. Additionally, for clarification purposes, the end of each price feed interval is shown. For example, overlapping with the order entry time interval $OE_2$ are the example price feed time intervals $PF_{2.1}$, $PF_{2.2}$, $PF_{2.3}$, $PF_{2.4}$ to $PF_{2.L}$. The primary subscript 2 denotes that the price feed time interval is associated with the example order entry time interval $OE_2$. The dotted-subscript denotes successive price feed time intervals within the order entry time interval (e.g., the example order entry time interval $OE_2$). Thus, subscript 2.1 indicates the end of the first price feed time interval within the example order entry time interval $OE_2$. The subscript 2.2 indicates the end of the second price feed time interval within the example order entry time interval $OE_2$, and so on. The end of the last price feed time interval associated with the order entry time interval $OE_2$ is identified by the subscript 2.L (where the L denotes "last").

In the illustrated example, the price feed intervals are contiguous. For example, the price feed time interval $PF_{2.2}$ begins when the price feed time interval $PF_{2.1}$ expires. Additionally, in the illustrated example of FIG. 5, no price feed intervals expire during an example matching interval. For example, the last price feed interval expires at the beginning of corresponding matching interval and begins at the expiration of the matching interval. In another example, the price feed information may be continuously published across order entry intervals and the matching/coordination intervals. Alternatively, the price feed information may be published during the matching interval. In some such examples, the price feed information may reflect changes to the electronic exchange's matching engine's order book during the matching interval. Additionally, the published price feed information may identify which price feed orders were received during the most recent example order entry interval and/or during the example matching interval. Alternatively, the price feed information may not reflect any changes during the matching interval.

In some examples, as few as one price feed may be published during an order entry interval (e.g., only one price feed time interval per order entry time interval). In some such examples, the price feed may be published at different times during the order entry intervals. For example, the price feed information may be published at the end of the corresponding order entry interval. This price feed information reflects the orders remaining in the electronic exchange's matching engine's (e.g., the example matching engine 234a of FIG. 2) order book. Additionally, the price feed information may reflect the trader orders received during the order entry interval. For example, the price feed information may be published at the expiration of the order entry time interval $OE_2$ (e.g., at time $t_{10}$). This price feed information would reflect the remaining trade orders and any new trade orders received during the example order entry time interval $OE_2$.

In some examples, the price feed information may be published at the end of the matching interval corresponding to the preceding order entry interval. This price feed information would reflect the trade orders remaining in the electronic exchange's matching engine's (e.g., the example matching engine 234a of FIG. 2) order book at the expiration of the preceding example matching interval and may include trade orders received during the example matching interval. For example, the price feed information may be published at the expiration of the matching time interval $MC_1$ (e.g., at time $t_6$). This price feed information would reflect the remaining trade orders and may also include trade orders received during the example matching time interval $MC_1$ (e.g., from time $t_5$ to time $t_6$).

In some examples, multiple price feed intervals may be included during an order entry interval. In some such examples, the number and length of the price feed intervals during an example order entry interval may vary. For example, a first price feed interval may expire at the expiration of an order entry interval and a second price feed interval may expire at the expiration of the corresponding matching interval. In some examples, multiple price feed intervals having approximately the same interval duration may publish price feed information throughout the corresponding order entry interval. In some examples, the price feed information may be published during the overlapping matching interval. In some such examples, the published price feed information may reflect changes to the electronic exchange's matching engine's order book occurring during the matching interval. In some examples, the published price feed information may not reflect any changes to the electronic exchange's matching engine's order book occurring during the matching interval.

In some examples, the price feed intervals may vary based on different classes and/or sets of market information data. For example, the duration of a price feed interval may depend on the quantity of trade orders received at inside market price levels or at other price levels. Additionally and/or alternatively, the duration of a price feed interval may depend on the receipt of a new price level on the inside market (e.g., a trade order received was with a new lower level for a best offer).

In some examples, when restrictions on modifying trade orders may apply, the published price feed information may reflect, for example, which quantities at price levels may not be changed during the current order entry interval. In some examples, the combinations described in connection to the order entry intervals and matching intervals of FIG. 4 may also apply.

Figure 6:
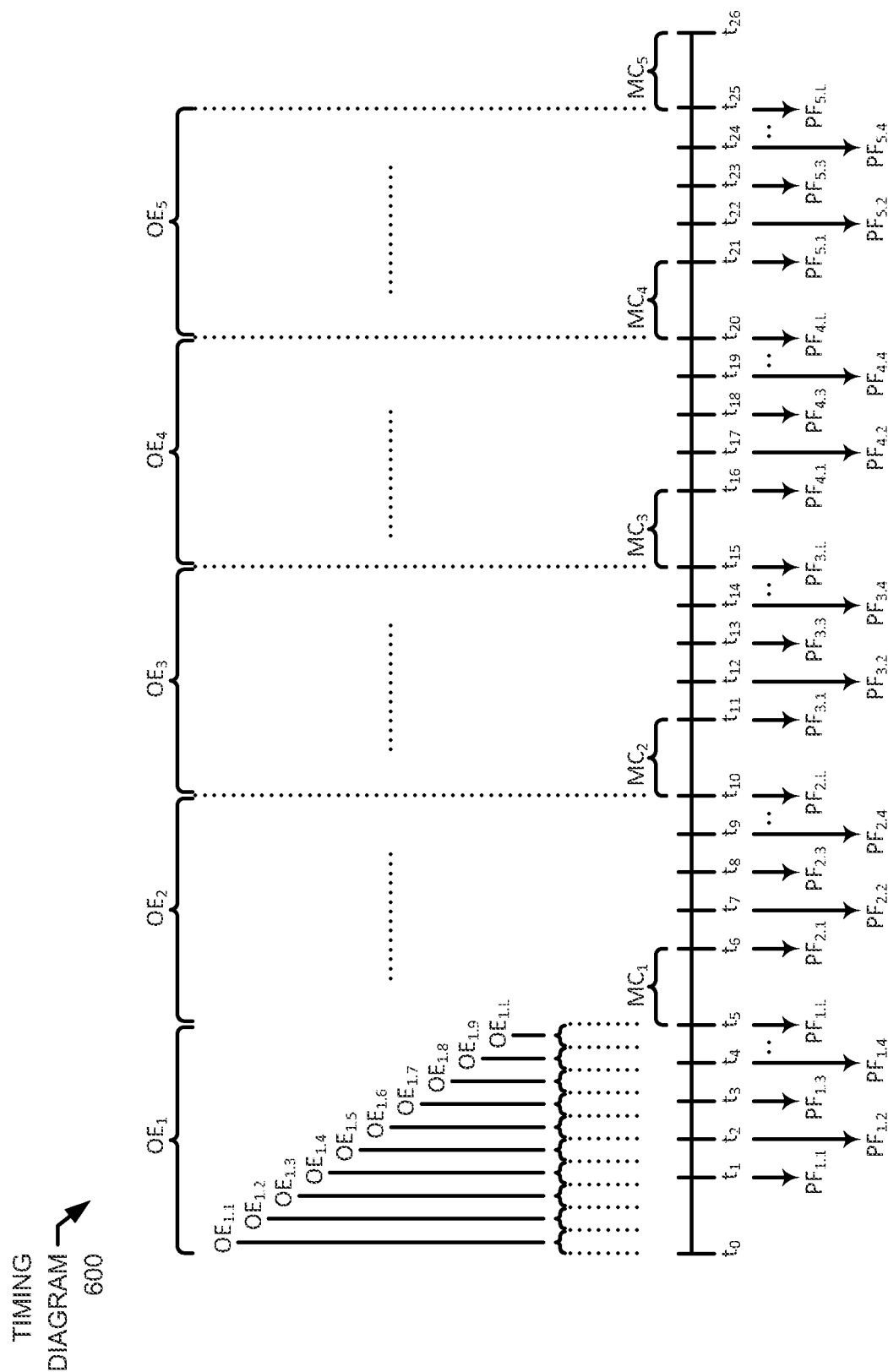
FIG. 6 illustrates an example timing diagram including order entry time intervals, matching time intervals and price feed time intervals as described in greater detail above in connection to FIG. 5.

VII. Example Order Entry, Matching, Price Feed Intervals and Order Entry Sub-Intervals FIG. 6 illustrates an example timing diagram 600 including order entry intervals, matching entry intervals and price feed intervals as described above in connection to FIG. 5. The example timing diagram 600 also includes order entry sub-intervals, which are identified by a dotted subscript. An example order entry interval may include one or more order entry sub-intervals. The example order entry time sub-intervals of the example order entry time interval $OE_1$ are denoted as $OE_{1.1}$, $OE_{1.2}$, to $OE_{1.L}$, where the subscripts 1 to L indicate each order entry time sub-interval within the order entry time interval $OE_1$.

In the illustrated example of FIG. 6, all trade orders received during the same order entry sub-interval are grouped together and commonly designated with the same identifier from the electronic exchange. In this way, each trade order received during a given order entry interval can be identified with respect to the entry interval and the entry sub-interval. For example, all trade orders received during the example order entry time sub-interval $OE_{1,2}$ are embedded (e.g., appended or prepended) with the same timestamp. Thus, any processes from the electronic exchange receive the same priority in matching. As a result, the never-ending race on the part of traders to get faster and faster may be significantly reduced. For example, when the trader's technical infrastructure is fast enough to permit information to be received, a trading decision to be made, and a trade order to be communicated to and received by the electronic exchange during the order entry sub-interval, the incentive in making the trader's technical infrastructure faster is negated.

By negating a benefit of continuously updating the technical infrastructure in order to become slightly faster, not only does the electronic exchange benefit, but also more traders may be able to participate. For example, the technical infrastructure of the electronic exchange does not need to continuously be updated, thereby lowering continuous updating expenses. Additionally, the continuous push to move the speed race from the millisecond range into the microsecond/nanosecond or even (conceivably) the picosecond ranges, does not result in more trades. For example, as the speed range continues to increase, more traders are unable to afford updates to their technical infrastructures and, therefore, lower the overall trade order participation. Thus, by reducing the benefit of continuously updating the technical infrastructure, trading becomes more affordable for a large number of traders.

In some examples when restrictions on modifying trade orders may apply, the restrictions may apply, for example, to the same (or a number of) order entry sub-interval. In some examples, the combinations described in connection to the order entry intervals and matching intervals of FIG. 4 may also apply. In some examples, the various combinations described in connection to the order entry intervals, matching intervals and price feed intervals of FIG. 5 may also apply.

In general, duration of the order entry intervals may be varied for each of the disclosed embodiments based on, for example, rules defined at the electronic exchange, one or more regulatory requirements, the time of day, the proximity to market opening events and/or market closing events, market volatility (e.g., the ebb and flow of market conditions) and/or other criteria.

In some examples, the different intervals (e.g., the order entry interval, the matching interval, the price feed interval and/or the order entry sub-interval) may be determined by different criteria. For example, the duration of an order entry time interval may be selected as equivalent to the current average inter-arrival time for trade orders against the same product or contract, the duration of a matching time interval may be selected to be a fraction of the order entry time interval, the duration of a price feed time interval may be the same length as the order entry time interval and may publish relative to the expiration of the matching time interval, and the duration of an order entry time sub-interval may be equivalent to, for example, a value one standard deviation less than the average inter-arrival time for trade orders against the same product or contract. An absolute magnitude of the time intervals may be measured in microseconds ($10^{-6}$ seconds) or nanoseconds ($10^{-9}$ seconds) or femtoseconds ($10^{-15}$ seconds) at the low end, to kiloseconds ($10^3$ seconds or approximately 16.67 minutes) or megaseconds ($10^6$ seconds or approximately 11.57 days) at the high end. In some examples, the absolute magnitude of time intervals may be substantially the same. In some examples, the absolute magnitude of time intervals may substantially differ over the trading session.

In some examples, the duration of an interval may be based on volume information. For example, an order entry interval may expire when a number of trade orders are entered. In some examples, the number of orders (or threshold) varies through the trading session. For example, the threshold may increase during period of high activity such as at the beginning and/or end of a trading session. In some examples, the duration of the intervals may depend on a combination of criteria. For example, an interval may expire when a time period elapses or a number of trades are entered.

In the illustrated example of FIGS. 4-6, the duration of the matching interval is less than the duration of the order entry interval. Alternatively, the duration of the matching interval may be equal to the duration of the order entry interval. In any case, it is not advisable to have the duration of the matching interval longer than the order entry interval.

In the illustrated examples of FIGS. 5 and 6, the example timing diagrams included price feed intervals. However, it is possible to not include price feed intervals. For example, "dark pools" may not publish price feed information during at least portions of the trading session. In instances including price feed intervals, the intervals may not be of equal duration. For example, as described above, it may not be preferred to publish price feed/market information data during a matching interval. Thus, the duration of a price feed interval may be extended (e.g., made longer) to prevent the price feed interval from expiring during the matching interval. In some examples, the duration of the order entry sub-intervals are shorter than or equal to the duration of the price feed intervals. In some examples, information regarding the current and planned future durations of intervals and/or changes in the intervals may be included in the market information data received by the traders.

As described above, the duration of the intervals at an electronic exchange may vary throughout a trading session. For example, the electronic exchange may modify the intervals based on the proximity to market opening events and/or market closing events. For example, the period between a market closing event and the following market opening event may be considered as a single, long open entry interval. This open entry interval may be followed by a matching interval at or near the following market opening event. In some examples, trade orders received during this extended open entry interval may include a single order entry sub-interval. As a result, the received trade orders are embedded with the same identifier (e.g., timestamp), and are processed similarly to pre-order periods in traditional electronic exchanges.

In some examples, the electronic exchange may vary the durations of the intervals based on the measured market volatility. For example, the duration of the order entry interval may gradually increase throughout the day based on a factor dependent on the severity of the market volatility. And, when the market volatility decreases (e.g., "died down," "smoothed out," etc.) or begins to reflect "normal" market conditions, the order entry intervals may gradually decrease to, for example, preset intervals at the electronic exchange. As a result, rather than triggering trading pauses or market halts that occur in traditional electronic exchanges, the adapting intervals can act as a gentle braking mechanism.

Figure 7:
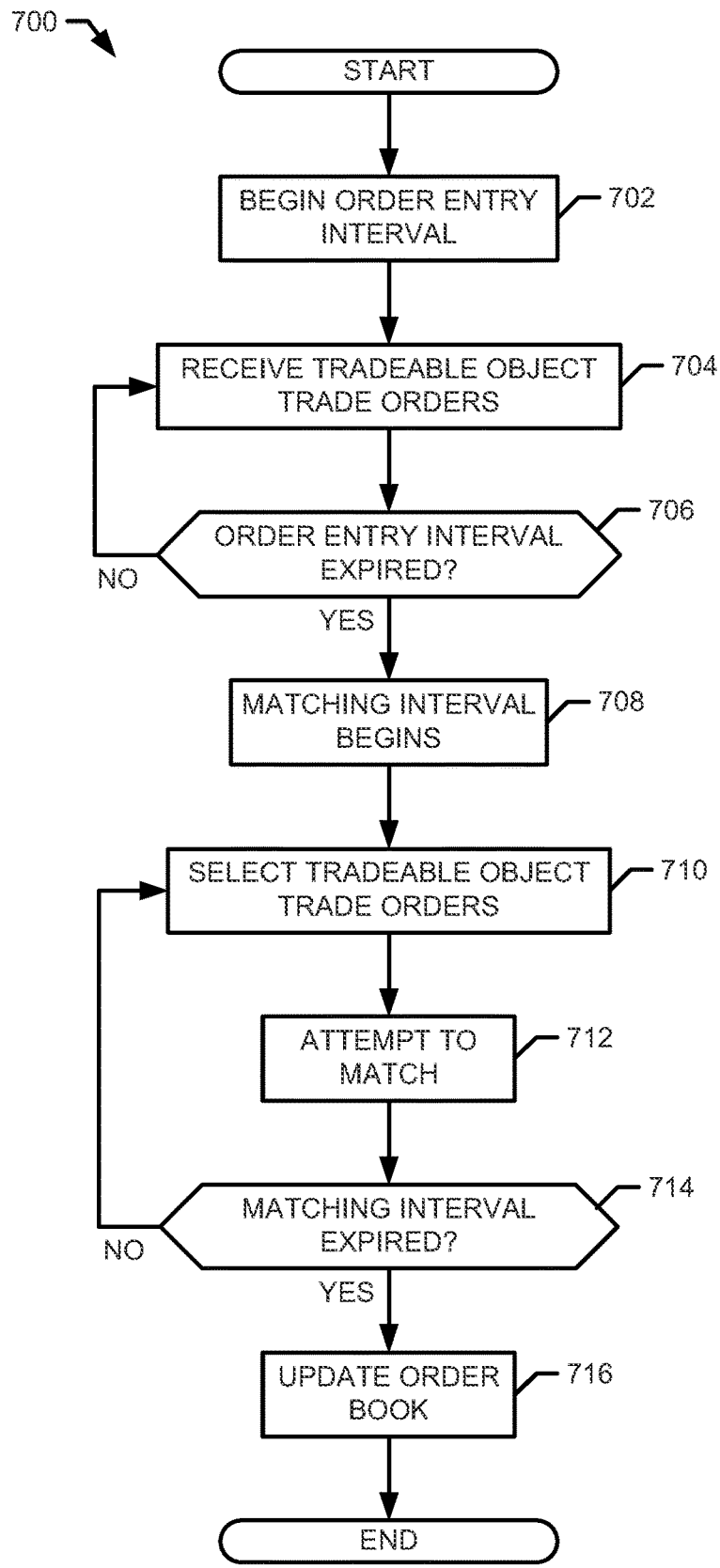
FIG. 7 illustrates a flow diagram for an example method or process to match contra-side orders during a trading session.

FIG. 7 illustrates a flow diagram for an example method or process 700 to match contra-side orders during a trading session. At block 702, an order entry interval at an electronic exchange begins. This open entry interval may be an initial open entry interval (e.g., near an opening event at an electronic exchange) or may be one during the trading session. At block 704, the electronic exchange receives trade orders from, for example, a trader. At block 706, the electronic exchange determines whether the open entry interval has expired. The duration of the open entry interval may be fixed throughout the trading session or may vary depending on market conditions. When the open entry interval has not expired, the electronic exchange returns to receive any more trade orders. In some examples, the order entry interval includes order entry sub-intervals. In some such examples, trade orders received during the same order entry interval may be embedded with the same identifier (e.g., timestamp). In the instance of sub-intervals, the electronic exchange determines whether the sub-interval has expired in the same manner as determining whether the order entry interval expired.

When the open entry interval has expired (e.g., a time period has elapsed or a number of trades have been entered), a corresponding matching interval begins at block 708. In some examples, the matching interval may overlap with a new open entry interval. In some other examples, the electronic exchange may not receive trade orders during the matching intervals, may receive but not acknowledge trade orders until later, or may receive and acknowledge with information that the order is in queue for future inclusion in the order book. At block 710, a trade order is selected to match. In some examples, the electronic exchange randomly selects a trade order. In some other examples, a trade order may have matching priority based on market conditions and/or previous attempts to match the trade order. At block 712, the electronic exchange attempts to match the trade order. For example, the electronic exchange may attempt to match contra-side buys and offers. A sell order is contra-side to a buy order with the same price or same quantity. Similarly, a buy order is contra-side to a sell order with the same price or same quantity. In some examples, the electric exchange may successfully match the trade order with a contra-side order. In some examples, the trade order may not be matched during the matching interval. At block 714, the electronic exchange determines whether the matching interval has expired. Similar to the open entry interval, the matching interval may be for a fixed duration or may vary throughout the trading session. If the matching interval did not expire, the electronic exchange returns to block 710 to select and match a trade order. Conversely, when the matching interval has expired, at block 716, the electronic exchange updates its order book. For example, the electronic exchange may record data related to unmatched quantity of trade orders. In some examples, the electronic exchange may delete/cancel any unmatched trade orders at the expiration of the matching interval. In some other examples, the electronic exchange may increase the matching priority of unmatched trade orders during the following matching interval.

VIII. Example Coordination Intervals

As described in above in connection to FIG. 4, a coordination operation may be performed during the matching/coordination interval. A coordination operation includes the matching engine of an electronic exchange communicating and coordinating with the matching engine of a plurality of other electronic exchanges to complete matching of a coordinated order. The matching engines of the electronic exchanges may communicate directly and/or indirectly with each other. A coordinated order is a trade order including more than one tradeable object and where at least one of the tradeable objects is controlled by a different matching engine. In other words, at least two separate matching engines are involved in matching a coordinated order. The example matching engines may be for different markets on the same electronic exchange or may be for markets on a plurality of different electronic exchanges.

Coordinated orders may be implemented through different mechanisms. For example, a cross-exchange spread order is an example coordinated order. Spread trading attempts to capitalize on changes in movement in the relationships between tradeable objects. Each tradeable object being traded as part of the spread order may be referred to as a leg or outright market. Similar to an exchange-traded spread involving a single electronic exchange, a cross-exchange spread order involves tradeable objects from two different matching engines/electronic exchanges. As a result, the risk of being legged (e.g., not having an offsetting/hedging order filled to achieve a desired strategy price) compared to trading the corresponding synthetic spread order is decreased. Subsequent risk management and margin requirement calculations may take into account the lower risk inherent in the placement and execution of coordinated orders versus the individual orders that would have to be independently submitted and managed by a trader or system operating on the trader's behalf.

An IFF (IF and only iF) order is another example of a coordinated order. In an IFF order, at least two (2) trade orders for different tradable objects with quantity at price are specified, and the trade order will be matched if and only if all the corresponding component orders can be matched.

No single matching engine is able to perform the matching operation of a coordinated order. This is because, by definition, a coordinated order involves at least two tradeable objects that are controlled by and/or traded on different matching engines/electronic exchanges. Thus, a coordination operation is performed to complete the matching operation between the (at least) two matching engines.

A benefit of processing coordination orders is increasing the likelihood of trade orders being matched. By using a coordinated order, a trader may be able to ensure that a combination of trade orders, each processed on a different electronic exchange, may be obtained at a desired price. In contrast, if the trader did not use a coordinated order, the trader may only obtain one leg of the trade orders at the desired price while other legs may have negatively changed in price and no longer being of value to the trader.

Similar to the matching interval, the example coordination interval may overlap with the order entry interval. In some examples, the order entry interval and the coordination interval may not overlap. For example, an order entry interval begins at the expiration of the coordination interval corresponding to the previous order entry interval.

In some examples, the coordination interval is distinct from the matching interval. For example, the matching/coordination time interval $MC_1$ of FIG. 4 may include a first time sub-interval during which the coordination operation is performed. The example matching/coordination time interval $MC_1$ may also include a second time sub-interval during which the matching operation is performed. Alternatively, in some examples, the matching operation is performed during the first time sub-interval and the coordination operation is performed during the second time sub-interval. In some examples, the matching interval may not overlap with any order entry interval while the coordination interval overlaps with an order entry interval.

In some examples, matching intervals and matching/coordination intervals (e.g., as distinct sub-intervals or as overlapping intervals) may alternate during the trading session. For example, every order entry interval may not include a corresponding coordination interval. This may prove useful in decreasing wasted bandwidth on unnecessary coordination operations/time intervals. In some examples, the matching intervals and matching/coordination intervals may alternate throughout the duration of the trading session. For example, even number order entry intervals include a corresponding matching/coordination interval while odd number order entry intervals may include only a corresponding matching interval. Other combinations are also possible (e.g., a corresponding coordination interval may only be included in every fifth order entry interval). In some examples, the inclusion of the corresponding coordination interval may depend on some criteria. For example, the coordination interval may only be included when a coordinated order is received. In some such examples, when a coordinated order is received, the matching/coordination interval begins alternating with the matching interval. This alternation may continue indefinitely or for a defined period. For example, the matching/coordination interval alternates for ten (10) order entry intervals each time a coordinated order is received at the electronic exchange. Other combinations are also possible.

Additional combinations including distinct order entry intervals, matching intervals, coordination intervals and/or a combination of intervals (e.g., the example matching/coordination interval) may also be applicable. Furthermore, the example restrictions described above in connection to order entry intervals and matching intervals and/or price feed intervals may also be applicable to coordination intervals. For example, a trade order received in an order entry interval may not be modified until the expiration of the corresponding matching interval and coordination interval.

Matching algorithms may be modified with respect to identifiers and priorities of component orders. For example, in traditional electronic exchanges, a First-In First-Out (FIFO) algorithm may be used. Similar to how customers in a bank queue are serviced in the same order they arrived, trade orders are matched in the same sequence they are received. By including order entry sub-intervals and embedding the same identifier (e.g., timestamp) to each trade order received during the same order entry sub-interval, the FIFO algorithm is modified to match order entries received based on the timestamps. In some examples, trade orders with the same identifier are matched randomly. In other words, the last trade order received during an order entry sub-interval has the same likelihood of being matched first as the first trade order received.

Trade orders which did not match during the corresponding matching/coordination interval may be addressed by various approaches. In some examples, a trade order that does not match is automatically deleted/canceled from the order book. In some examples, the unmatched trade order may continue to stay in the order book until it matches. In some such examples, the unmatched trade order may receive an updated identifier to correspond with the new order entry interval. Alternatively, the unmatched trade order may continue with the same identifier it was originally embedded with and, therefore, may be prioritized during the subsequent matching interval. Other combinations are also possible. For example, an unmatched trade order may remain on the order book for a defined number of matching/coordination intervals. If, for example, the trade order is not matched after three matching coordination intervals expire, the unmatched trade order may be deleted/canceled.

IX. Example Matching Algorithms and Illustrative Methods and Processes to Perform a Coordinated Operation in a Coordination Group The matching algorithm may be modified when multiple matching engines/electronic exchanges are in communication, such as during a coordination operation, using different approaches. For example, the matching engine may try to match all local trade orders (e.g., on the same matching engine), and then attempt to match any remaining quantities as coordinated orders across matching engines/electronic engines. In some examples, the component orders may have different relative positions with respect to matching priority on the individual tradeable object. For example, the matching priority of a component of an IFF coordinated order may vary with respect to the other tradeable object. In some examples, the matching priority may change based on order size. For example, a larger trade order may improve the relative position of the trade order. In some examples, traders may be able to pay a premium on a trade order to improve the relative position of that trade order. In some examples, the coordination process may selectively raise or lower the matching priority of one tradeable object or the other based on the rules of the electronic exchange. In some examples, the coordination operation is performed (e.g., during a first matching/coordination sub-interval) and all relevant trader orders from the plurality of electronic exchanges/matching engines are processed as a coordination group. The coordination group is then processed for matching by the matching algorithm (e.g., during a second matching/coordination sub-interval).

In some examples, the coordination process during a matching/coordination interval may involve direct communication among a plurality of electronic exchanges/matching engines. Coordination groups are a collection of electronic exchange matching entities that collectively communicate and coordinate to process the matching of coordinated orders. The matching engines in the coordination group may be on the same electronic exchange or may be on different electronic exchanges. For example, an electronic exchange may include a market that offers trading in multiple products. In some examples, the matching engines in the coordination group may be in the same geographical location or different geographical locations.

Figure 8:
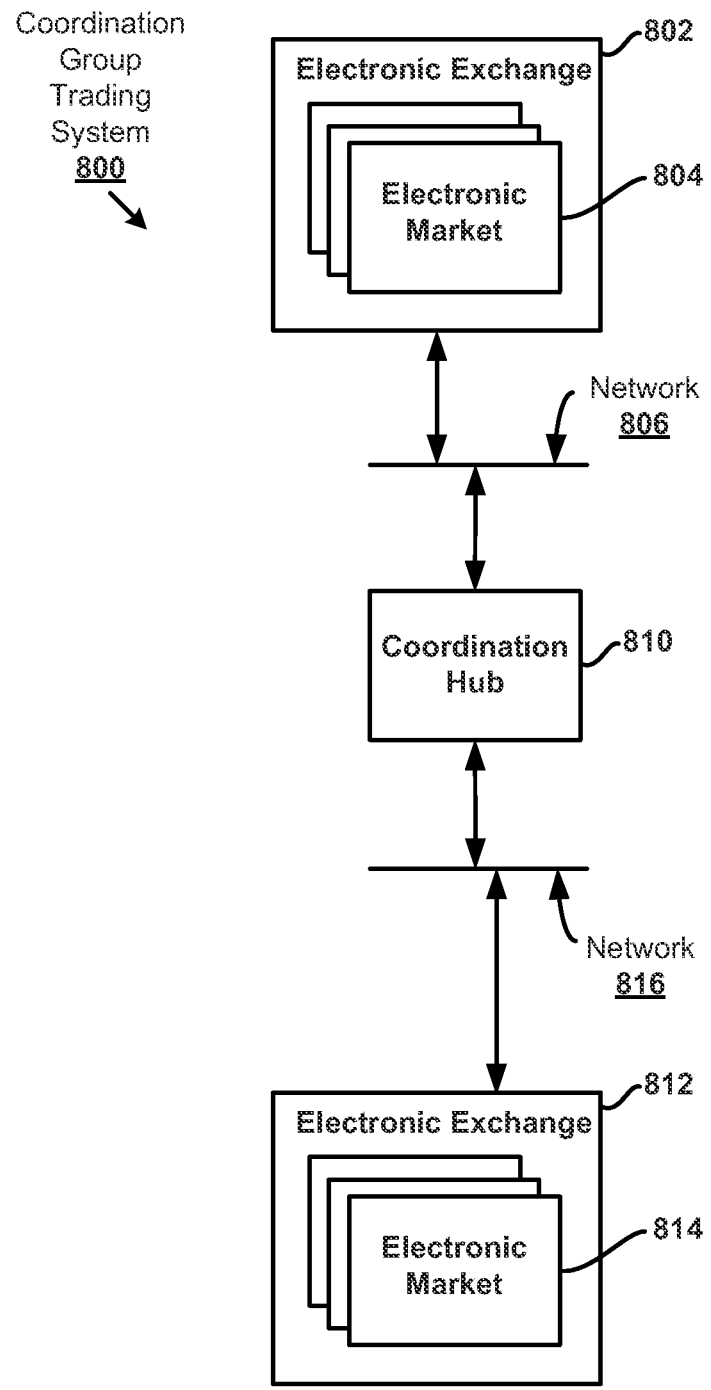
FIG. 8 illustrates an example coordination group trading system including a communication hub.

In some examples, the coordination process during the matching/coordination interval may include indirect communication via a coordination hub. FIG. 8 illustrates an example coordination group trading system 800 including a communication hub 810. During a matching/coordination interval, the example coordination hub 810 may connect several exchange engines together. In the illustrated example, a first electronic exchange 802, including electronic markets 804, communicates with the example coordination hub 810 via the network 806. The illustrated example also includes a second electronic exchange 812 including electronic markets 814, that communicates with the example coordination hub 810 via the network 816. In some examples, the coordination hub 810 may operate as a processing location. For example, all or part of matching coordinated orders may take place at the coordination hub 810. In some other examples, the coordination hub 810 may operate as a translator during matching of coordinated orders. For example, the coordination hub 810 may ensure that the correct information (e.g., market information data)

regarding coordinated orders is communicated to the correct matching engine. In some other examples, the coordination hub 810 may route coordinated orders between the market exchanges. For example, the electronic exchange 812 may fill a coordinated order received from the electronic exchange 802. The example coordination hub 810 may route the results of the coordinated order matching operations to the example electronic exchange 802 (e.g., the originating matching engine) and any matching engines involved in the processing of the coordinated order (e.g., the example electronic exchange 812).

In some examples, an IFF (IF and only iF) order is sent to the coordination hub 810. The coordination hub 810 communicates to all related matching engines that it has something to match. During each subsequent matching/coordination interval, each matching engine passes information on relevant working orders to the coordination hub 810. When the coordination hub 810 has a match to the IFF order, the coordination hub 810 communicates to all of the matching engines of the matches. When the coordination 810 does not have a match to the IFF order, the coordination hub 810 communicates to all off the matching engines that the working orders have not been matched.

In some examples, the coordination process may be controlled via a distributed matching/coordination algorithm. For example, the algorithm processes received information the same way at each matching engine in the coordination group. This allows the matching engines to communicate only relevant information rather than any and/or all information via the communication hub. As a result, the available bandwidth at each matching engine is increased as irrelevant processing is not performed. Additionally, network transmission between the coordination group is improved as extraneous information is not being communicated unnecessarily over the network.

In some examples, the location the matching operation is performed may relocate dynamically. For example, the matching operation may be relocated from the original electronic exchange to another location (e.g., a coordination hub or different electronic exchange) so that the matching of all coordinated orders is performed at a single location/matching engine. The relocation may change during a trading session based on the market data. For example, during a period of high frequency of coordinated orders, the matching operation may be moved to a single location/matching engine. Additionally and/or alternatively, when the number of coordination orders remains low during a period, the matching operation may be performed at the original matching engine and no relocation is performed.

In some examples, the matching engines included in a coordination group have substantially aligned matching/coordination intervals. Aligning the matching/coordination intervals ensures that the matching engines are able to accomplish the communication and coordination. For example, if there is no overlap of matching/coordination intervals between the matching engines, then the coordination operation is unnecessary. However, a strict alignment (e.g., a lock-step alignment) of the intervals is not necessary. In other words, the matching/coordination intervals do not need to be aligned to the millisecond, microsecond, nanosecond, etc. For example, different matching engines may have different length time intervals and/or a different frequency of matching/coordination intervals. For example, the example electronic exchange 802 may have matching/coordination intervals twice as frequently as the example electronic exchange 812. In some such examples, the coordination operation between the two example electronic exchanges is performed during periods of overlapping matching/coordination time intervals.

In some examples, the matching engines schedule coordination intervals at times convenient to the matching engine. In some such examples, the coordination operation is performed when there is an overlap of the coordination intervals of the matching engines. This proves useful as no alignment of coordinated intervals is required. Though not necessarily performed corresponding to each order entry interval, statistically there will be overlaps of coordination intervals throughout the trading session.

In some other examples not requiring an alignment of coordination intervals, an electronic exchange may place special types of trade orders to be received by another electronic exchange in the coordination group. For example, a "check with me before matching" (CWMBM) order may be communicated from the example electronic exchange 802 to the example electronic exchange 812. As a result, when the example electronic exchange 812 is prepared to perform a matching operation involving the CWMBM order, the example electronic exchange 812 performs a just-in-time coordination with the example electronic exchange 802 to ensure that the conditions of the original coordinated order are still applicable. When the example electronic exchange 802 indicates the conditions are still applicable, the example electronic exchange 812 performs the matching operation on the CWMBM order. This approach only needs inter-exchange coordination at the moment of performing a matching operation to complete the coordinated order.

While the illustrated coordination group trading system 800 of FIG. 8 includes the single example coordination hub 810, it is possible that multiple coordination hubs may be included. The multiple coordination hubs may be connected in a variety of network topologies, including hierarchical tree structures or other specially optimized structures. For example, multiple coordination hubs may be located in the same geographic location and divide the bandwidth needed to process the coordinated orders over multiple coordination hubs. In some other examples, multiple coordination hubs may communicate and coordinate with each other, where each coordination hub first processes coordinated orders included local electronic markets.

The matching/coordination interval and a coordination group for a set of tradeable objects affords a trader the opportunity to trade, via a connection to a single matching engine, tradeable objects which are being traded on separate matching engines. In such instances, providing the trader the price feed/market information data about the tradeable objects from those other matching engines would be beneficial.

Using traditional electronic exchanges, the trader would need to make separate arrangements with each electronic exchange to receive the desired price feed/market information data.

In some examples, an electronic exchange may choose to distribute price feed/market information data from other exchange matching engines which are involved in a coordination group. The timing of such a price feed may be identical to the price feed intervals of the matching engine which originated the information. Alternatively, the timing of the price feed may be longer than what is used by the original matching engine. An electronic exchange may use this to align the price feed intervals for a tradeable object on its own matching engine with the price feed intervals used for distributing information for a traded on some other matching engine within the coordination group. Thus, the trader would receive the desired information in a much simpler approach.

Figure 9:
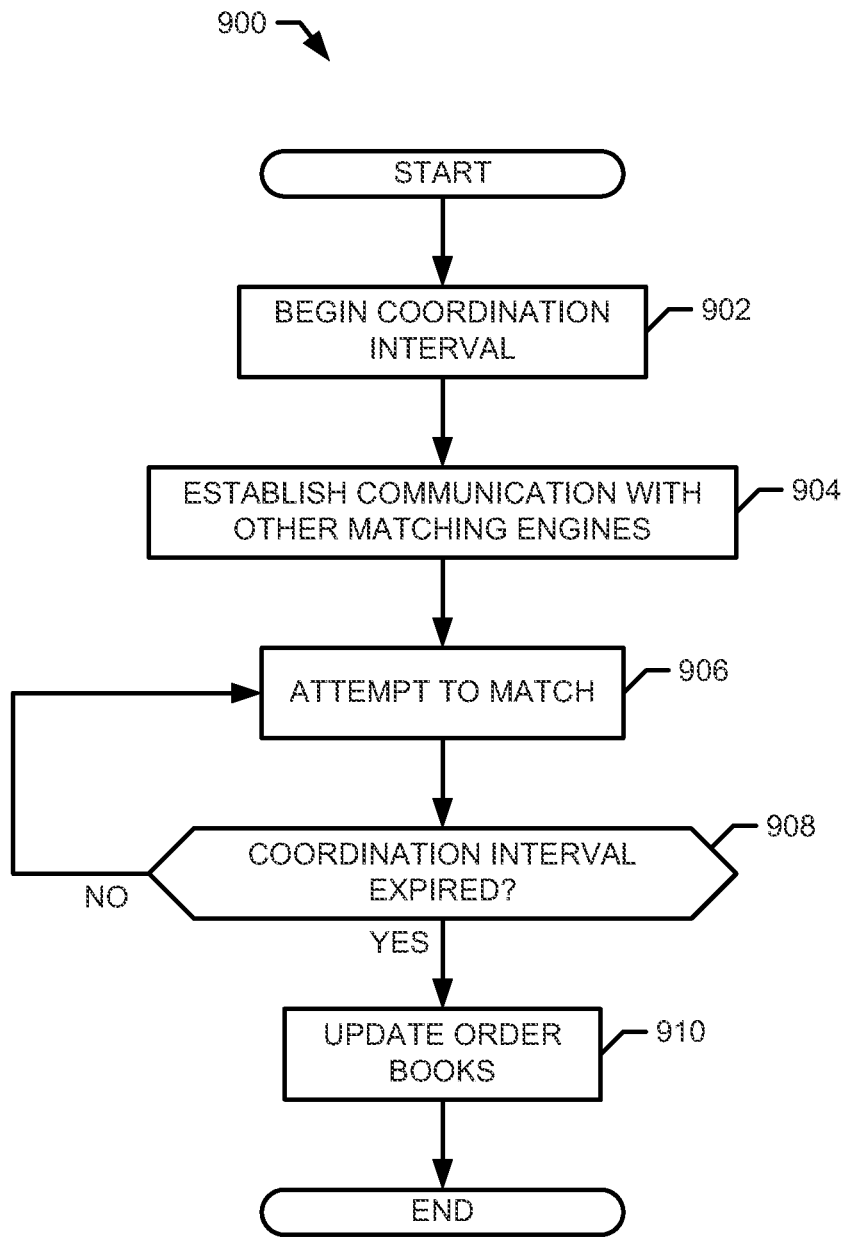
FIG. 9 illustrates a flow diagram for an example method or process to perform a coordinated operation in a coordination group.

FIG. 9 illustrates a flow diagram for an example method or process 900 to perform a coordinated operation in a coordination group. At block 902, the coordination interval begins. In some examples, the coordination time interval may overlap with the matching interval and/or the order entry interval. At block 904, the matching engine of the originating electronic exchange establishes communication with other matching engines included in a coordinated group. A coordination group is a plurality of matching engines that collectively communicate and coordinate to process the matching of coordinated orders. In some examples, the matching engine may directly communicate with the other matching engines. In some other examples, the matching engines in the coordination group may indirectly communicate via, for example, a coordination hub or multiple coordination hubs. The coordination hub facilitates communication between the tulle matching engines. For example, the connection hub may route information to the appropriate matching engines.

At block 906, the matching engine attempts to match the coordinated order with, for example, a contra-side order at one of the other matching engines. At block 908, the electronic exchange determines whether the coordination interval has expired. If the coordination interval has expired, the matching engine of the electric exchange returns to attempt to match the coordinated order. When the coordination interval has expired, at block 910, the matching engines update their order books. In some examples, each of the matching engines included in the coordination group may update their order books to reflect, for example, any remaining unmatched quantities.

It should be noted that while the order entry interval, the matching interval and the coordination interval of FIGS. 7 and 9 were described in a serial manner, any combination of the intervals may overlap. For example, the matching operation and the coordination operation may be performed during the same interval. In some such examples, the matching engine may attempt to perform both operations at the same time. In some other examples, the matching engine may first try to match any trade orders locally (e.g., on the electric exchange) and then attempt to perform the coordination operation. In some examples, the following order entry interval may overlap with the matching interval and/or the coordination interval.

From the foregoing, it will appreciate that disclosed methods, systems and articles of manufacture reduce the need to continuously race to be a fraction faster than other traders. The methods, systems and articles of manufacture decouple the order entry operation and the matching operation, and thereby generate distinct intervals during which each operation is performed. The methods, systems and articles of manufacture allow electronic exchanges to perform a coordination operation between a plurality of electronic exchanges, thereby increasing the likelihood of accomplishing the desired results from the trade order.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:
    setting by a computing device at a first electronic exchange a first order entry interval associated with a threshold that controls a duration of a first period associated with the first order entry interval, wherein the threshold is based on a total volume associated with trade orders to be received during the first order entry interval, wherein no orders received during the first order entry interval are matched until the first order entry interval expires;
    initiating by the computing device the first period of the first order entry interval in response to receiving a plurality of trade orders including a first trade order during the first period corresponding to the first order entry interval;
    determining by the computing device whether the total volume of the plurality of trade orders received during the first period satisfies the threshold associated with the first order entry interval;

detecting by the computing device an expiration of the first order entry interval when the threshold is satisfied;

starting by the computing device a matching interval after the expiration of the first order entry interval, wherein the matching interval includes a second period subsequent to the first period;

establishing a connection between the first electronic exchange and a centralized coordination hub and a second electronic exchange and the centralized coordination hub, wherein the first electronic exchange and the second electronic exchange are in communication with the centralized coordination hub;

receiving, at the centralized coordination hub, first electronic exchange market information data from the first electronic exchange, wherein the first electronic exchange market information data comprises the first trade order;

receiving, at the centralized coordination hub, second electronic exchange market information data from the second electronic exchange, wherein the second electronic exchange market information data comprises one or more opposing trade orders placed at the second electronic exchange; and matching by a matching engine at the centralized coordination hub the first trade order, during the matching interval, with the one or more opposing trade orders from the second electronic exchange, the first trade order having a same price as the one or more opposing trade orders.

2. The method of claim 1, further including:

matching by the computing device, during the matching interval, the first trade order with one or more opposing trade orders received during a prior order entry interval.

3. The method of claim 1, wherein the first order entry interval includes a plurality of order entry sub-intervals.

4. The method of claim 1, wherein the plurality of trade orders received during the first order entry interval are embedded with a common identifier.

5. The method of claim 4, wherein the common identifier is a timestamp.

6. The method of claim 4, wherein matching the first trade order further includes:

selecting by the computing device the first trade order from the plurality of trade orders received during the first order entry interval; and matching by the computing device the first trade order with the one or more opposing trade orders based on the common identifier.

7. The method of claim 6, wherein the one or more opposing trade orders is randomly selected.

8. The method of claim 1, further including:

coordinating by the computing device with an electronic exchange regarding a status of the first trade order during a coordination interval and wherein matching the first trade order is performed during the coordination interval.

9. The method of claim 8, wherein coordinating with the electronic exchange further includes:

communicating by the computing device with at least a coordination hub and the coordination hub communicating with the electronic exchange.

10. The method of claim 1, further including:

publishing by the computing device a price feed at the expiration of a price feed interval.

11. The method of claim 10, wherein the price feed interval expires at the expiration of the first order entry interval.

12. The method of claim 1, further including:

starting by the computing device a second order entry interval associated with a third period starting after the expiration of the first order entry interval.

13. The method of claim 12, wherein the second order entry interval is associated with the threshold that also controls the duration of the third period.

14. The method of claim 12, further including:

starting by the computing device a delay period during which a received trade order is not processed, the delay period starting at the expiration of the first order entry interval and expiring at the start of the second order entry interval.

15. The method of claim 1, wherein the first period is continuous to the second period.

16. The method of claim 1, wherein the duration of the first period is further based on a time period.

* * * * *